United States Patent
Makhijani et al.

(10) Patent No.: US 10,554,551 B2
(45) Date of Patent: Feb. 4, 2020

(54) METHOD TO OPTIMIZE MAPPING FOR MULTIPLE LOCATIONS OF A DEVICE IN MOBILITY

(71) Applicant: Futurewei Technologies, Inc., Plano, TX (US)

(72) Inventors: Kiran Makhijani, Los Gatos, CA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/726,010

(22) Filed: Oct. 5, 2017

(65) Prior Publication Data

US 2018/0139133 A1   May 17, 2018

Related U.S. Application Data

(60) Provisional application No. 62/421,015, filed on Nov. 11, 2016.

(51) Int. Cl.
*H04L 12/749* (2013.01)
*H04W 60/00* (2009.01)
(Continued)

(52) U.S. Cl.
CPC ......... *H04L 45/741* (2013.01); *H04W 60/005* (2013.01); *H04W 72/1263* (2013.01); *H04L 61/2007* (2013.01); *H04L 67/16* (2013.01)

(58) Field of Classification Search
CPC ....... H04L 45/00; H04L 45/741; H04L 45/74; H04L 45/745; H04L 61/10;
(Continued)

(56) References Cited

U.S. PATENT DOCUMENTS

| 6,587,689 B1* | 7/2003 | Panasik | G01S 19/39 |
| | | | 342/357.22 |
| 7,245,619 B1* | 7/2007 | Guan | H04L 45/02 |
| | | | 370/389 |

(Continued)

FOREIGN PATENT DOCUMENTS

CN   102868599 A   1/2013
CN   103037360 A   4/2013
(Continued)

OTHER PUBLICATIONS

Farinacci, et al., "LISP Predictive RLOCs," draft-farinacci-lisp-predictive-rlocs-00, May 2016, 13 pages.
(Continued)

*Primary Examiner* — Warner Wong
(74) *Attorney, Agent, or Firm* — Conley Rose, P.C.

(57) ABSTRACT

A method implemented by a sending host implemented as a network element (NE) comprises receiving, by a receiver of the sending host, a set of locators from a distributed mapping system, each of the locators in the set of locators being an address associated with the receiving host, storing, in a memory of the sending host, the set of locators in an entry of a local identifier (ID)-to-locator database in association with an ID of the receiving host, transmitting, by a transmitter of the sending host, a plurality of packets to a plurality of endpoint routers (xTRs), each of the xTRs associated with each of the locators in the set of locators, and receiving, by the receiver of the sending host, a response from one of the xTRs in response to sending the plurality of packets to the plurality of xTRs, a locator associated with the one of the xTRs being an address of a current location of the receiving host.

19 Claims, 9 Drawing Sheets

(51) Int. Cl.
  *H04W 72/12* (2009.01)
  *H04L 29/12* (2006.01)
  *H04L 29/08* (2006.01)
(58) Field of Classification Search
  CPC ............ H04L 61/2007; H04L 61/6077; H04L
    29/12009; H04L 29/12952; H04L 60/005;
    H04L 72/1263; H04L 65/1073; H04L
    67/16; H04W 60/005; H04W 72/1263
  See application file for complete search history.

(56) References Cited

U.S. PATENT DOCUMENTS

| | | | | |
|---|---|---|---|---|
| 10,110,554 | B2* | 10/2018 | Yoon | H04L 61/2507 |
| 2012/0214506 | A1 | 8/2012 | Ole-Petter et al. | |
| 2013/0089018 | A1* | 4/2013 | Kim | H04W 8/02 |
| | | | | 370/312 |
| 2013/0198369 | A1* | 8/2013 | Kim | H04L 61/103 |
| | | | | 709/224 |
| 2013/0243004 | A1* | 9/2013 | Hikichi | H04L 12/66 |
| | | | | 370/401 |
| 2013/0279508 | A1* | 10/2013 | Kano | H04L 45/742 |
| | | | | 370/392 |
| 2014/0297875 | A1* | 10/2014 | Cheng | H04L 61/103 |
| | | | | 709/226 |
| 2014/0301387 | A1* | 10/2014 | Subramanian | H04L 45/02 |
| | | | | 370/389 |
| 2015/0003455 | A1 | 1/2015 | Haddad et al. | |
| 2015/0156183 | A1 | 6/2015 | Beyer et al. | |
| 2016/0065531 | A1* | 3/2016 | Xiaopu | H04L 61/103 |
| | | | | 709/238 |
| 2017/0078241 | A1* | 3/2017 | Zhang | H04L 61/103 |
| 2017/0339623 | A1* | 11/2017 | Pillay-Esnault | H04L 45/16 |
| 2018/0039505 | A1* | 2/2018 | Lin | H04L 29/02 |
| 2018/0091471 | A1* | 3/2018 | Hooda | H04L 61/2015 |
| 2018/0309659 | A1* | 10/2018 | Ko | H04L 45/124 |

FOREIGN PATENT DOCUMENTS

| | | | | |
|---|---|---|---|---|
| CN | 103166856 A | | 6/2013 | |
| CN | 103686905 A | | 3/2014 | |
| EP | 1473890 A2 | | 11/2004 | |
| WO | WO2011131088 | * | 10/2011 | H04L 12/56 |
| WO | WO2013044691 | * | 4/2013 | H04L 12/56 |

OTHER PUBLICATIONS

Farinacci, et al., "The Locator/ID Separation Protocol (LISP)," RFC 6830, Jan. 2013, 75 pages.
Fuller, et al., "Locator/ID Separation Protocol (LISP) Map-Server Interface," RFC 6833, Jan. 2013, 13 pages.
Pillay-Esnault, "Predictive Routing for Mobility," U.S. Appl. No. 62/332,639, filed May 6, 2016, 27 pages.
Farinacci, D., et al., "LISP Geo-Coordinate Use-Cases," draft-farinacci-lisp-geo-00, Apr. 14, 2016, 6 pages.
Farinacci, D., et al., "LISP Geo-Coordinate Use-Cases," draft-farinacci-lisp-geo-01, Oct. 12, 2016, 7 pages.
Farinacci, D., et al., "LISP Geo-Coordinate Use-Cases," draft-farinacci-lisp-geo-02, Oct. 28, 2016, 10 pages.
Farinacci, D., et al., "LISP Predictive RLOCs," draft-farinacci-lisp-predictive-rlocs-01, Nov. 13, 2016, 13 pages.
Farinacci, D., et al., "LISP Data-Plane Confidentiality," draft-ietf-lisp-crypto-03, Dec. 4, 2015, 17 pages.
Farinacci, D., et al., "LISP Data-Plane Confidentiality," draft-ietf-lisp-crypto-04, May 31, 2016, 18 pages.
Farinacci, D., et al., "LISP Data-Plane Confidentiality," draft-ietf-lisp-crypto-05, Jun. 27, 2016, 18 pages.
Farinacci, D., et al., "LISP Data-Plane Confidentiality," draft-ietf-lisp-crypto-06, Jun. 29, 2016, 18 pages.
Farinacci, D., et al., "LISP Data-Plane Confidentiality," draft-ietf-lisp-crypto-07, Sep. 19, 2016, 19 pages.
Farinacci, D., et al., "LISP Data-Plane Confidentiality," draft-ietf-lisp-crypto-08, Sep. 25, 2016, 19 pages.
Farinacci, D., et al., "LISP Data-Plane Confidentiality," draft-ietf-lisp-crypto-09, Oct. 12, 2016, 21 pages.
Farinacci, D., et al., "LISP Data-Plane Confidentiality," draft-ietf-lisp-crypto-10, Oct. 14, 2016, 21 pages.
Farinacci, D., et al., "LISP Canonical Address Format (LCAF)," draft-ietf-lisp-lcaf-12, Mar. 14, 2016, 41 pages.
Farinacci, D., et al., "LISP Canonical Address Format (LCAF)," draft-ietf-lisp-lcaf-13, May 3, 2016, 41 pages.
Farinacci, D., et al., "LISP Canonical Address Format (LCAF)," draft-ietf-lisp-lcaf-14, Jul. 19, 2016, 41 pages.
Farinacci, D., et al., "LISP Canonical Address Format (LCAF)," draft-ietf-lisp-lcaf-15, Sep. 19, 2016, 43 pages.
Farinacci, D., et al., "LISP Canonical Address Format (LCAF)," draft-ietf-lisp-lcaf-16, Oct. 1, 2016, 43 pages.
Farinacci, D., et al., "LISP Canonical Address Format (LCAF)," draft-ietf-lisp-lcaf-17, Oct. 12, 2016, 43 pages.
Farinacci, D., et al., "LISP Canonical Address Format (LCAF)," draft-ietf-lisp-lcaf-18, Oct. 14, 2016, 44 pages.
Farinacci, D., et al., "LISP Canonical Address Format (LCAF)," draft-ietf-lisp-lcaf-19, Oct. 18, 2016, 44 pages.
Farinacci, D., et al., "LISP Canonical Address Format (LCAF)," draft-ietf-lisp-lcaf-20, Oct. 29, 2016, 44 pages.
Farinacci, D., et al., "LISP Canonical Address Format (LCAF)," draft-ietf-lisp-lcaf-21, Nov. 16, 2016, 44 pages.
Farinacci, D., et al., "LISP Canonical Address Format (LCAF)," draft-ietf-lisp-lcaf-22, Nov. 28, 2016, 47 pages.
Maino, F., et al., "LISP-Security (LISP-SEC)," draft-ietf-lisp-sec-10, Apr. 13, 2016, 19 pages.
Maino, F., et al., "LISP-Security (LISP-SEC)," draft-ietf-lisp-sec-11, Oct. 3, 2016, 19 pages.
Maino, F., et al., "LISP-Security (LISP-SEC)," draft-ietf-lisp-sec-12, Nov. 16, 2016, 22 pages.
Moreno, V., et al., "Signal-Free LISP Multicast," draft-ietf-lisp-signal-free-multicast-01, Apr. 21, 2016, 19 pages.
Moreno, V., et al., "Signal-Free LISP Multicast," draft-ietf-lisp-signal-free-multicast-02, Oct. 17, 2016, 19 pages.
Portoles, M., et al., "LISP L2/L3 EID Mobility Using a Unified Control Plane," draft-portoles-lisp-eid-mobility-00, Apr. 7, 2016, 20 pages.
Farinacci, D., et al., "LISP Predictive RLOCs," draft-farinacci-lisp-predictive-rlocs-00, May 6, 2016, 13 pages.
Bradner, S., et al., "Key words for use in RFCs to Indicate Requirement Levels," RFC 2119, Mar. 1997, 3 pages.
Notice of Allowance dated Feb. 25, 2019, U.S. Appl. No. 15/584,957, filed May 2, 2017, 9 pages.
Supplemental Notice of Allowability dated Mar. 20, 2019, U.S. Appl. No. 15/584,957, filed May 2, 2017, 6 pages.

* cited by examiner

METHOD TO OPTIMIZE MAPPING FOR MULTIPLE LOCATIONS OF A DEVICE IN MOBILITY

CROSS-REFERENCE TO RELATED APPLICATIONS

The present application claims benefit of U.S. Provisional Patent Application No. 62/421,015 filed Nov. 11, 2016 by Kiran Makhijani and Renwei Li, entitled "A Method to Optimize Mapping for Multiple Locations of a Device in Mobility," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Currently, the Internet widely uses Internet Protocol (IP) address nodes. An IP address is a numerical label assigned to each device (e.g., computer, printer) participating in a computer network that uses IP for communication. An IP address serves two principal functions: host or network interface identification and location addressing. Two versions of the IP are in use: IP Version 4 (IPv4) and IP Version 6 (IPv6). Therefore, an IP address serves to identify both the location and an identity of a node. However, such IP semantics are problematic because when nodes, such as a user equipment (UE), move from one location to the next, the IP address cannot remain the same. The moving of the UE without changing the IP address to account for the new location results in a sudden loss of an established connection session. Therefore, it is difficult to implement mobility of nodes in a network utilizing IP semantics.

SUMMARY

In an embodiment, the disclosure includes a method implemented by a sending host in an Identifier Enabled Network (IEN), comprising receiving, by a receiver of the sending host, a set of locators from a distributed mapping system, each of the locators in the set of locators being an address associated with the receiving host, storing, in a memory of the sending host, the set of locators in an entry of a local identifier (ID)-to-locator database in association with an ID of the receiving host, transmitting, by a transmitter of the sending host, a plurality of packets to a plurality of endpoint routers (xTRs), each of the xTRs associated with each of the locators in the set of locators, and receiving, by the receiver of the sending host, a response from one of the xTRs in response to sending the plurality of packets to the plurality of xTRs, a locator associated with the one of the xTRs being an address of a current location of the receiving host. In some embodiments, the method further includes transmitting, by a transmitter of the sending host, a request for the locator of the receiving host to the distributed mapping system, wherein the request comprises the ID of the receiving host. In some embodiments, the method further includes updating, by a processor of the sending host, an entry of a local ID-to-locator database to indicate that the locator in the set of locators is the address of the current location of the receiving host. In some embodiments, the sending host and the receiving host are user equipment (UEs) associated with different end users. In some embodiments, the sending host is a mobile device that is initiating communication with the receiving host. In some embodiments, the method further includes receiving, by the receiver, a second response from a second xTR when a locator of the receiving host changes.

In an embodiment, the disclosure includes a receiving xTR implemented as a network element (NE), comprising a transmitter configured to transmit a set of locators to a distributed mapping system, each of the locators in the set of locators being an address of one or more receiving xTRx, the receiving host being associated with the receiving xTRs, and a receiver coupled to the transmitter and configured to receive a first packet from a sending xTR associated with a sending host, the transmitter being further configured to transmit a second packet to the sending xTR responsive to receiving the first packet, and the second packet comprising a locator indicating an address of a current location of the receiving host. In some embodiments, the receiving xTR further comprises a processor coupled to the transmitter and the receiver and configured to select the locator to add to the set of locators in response to determining that the receiving host has associated with the locator more than a predetermined number of times. In some embodiments, the receiving xTR further comprises a processor coupled to the transmitter and the receiver and configured to select the locator to add to the set of locators in response to determining that the receiving host has a pattern of associating with the locator. In some embodiments, the set of locators is transmitted in a field of a map-register message according to a Locator/Identification Separation Protocol (LISP). In some embodiments, the transmitter is further configured to transmit a third packet to a second sending xTR when the receiving host changes locators to a second locator, wherein the second sending xTR is addressed by the second locator. In some embodiments, the receiving xTR is a router by which the receiving host is reachable.

In an embodiment, the disclosure includes a mapping system, comprising a receiver configured to receive a set of locators from a first NE, each of the locators in the set of locators being an address associated with a receiving host, a memory coupled to the receiver and configured to store the set of locators in an entry of an ID-to-locator database, the entry being associated with an ID of the receiving host, the receiver being further configured to receive a request for a locator associated with the ID of the receiving host from a second NE, and a transmitter coupled to the memory and configured to transmit the set of locators to the second NE. In some embodiments, the request comprises the ID of the receiving host. In some embodiments, the first NE is a router by which the receiving host is reachable, the second NE is a router by which a sending host is reachable. In some embodiments, the ID-to-locator database is organized according to IDs of a plurality of hosts, and each entry in the ID-to-locator database comprises a set of locators for each of the hosts. In some embodiments, the entry of the routing ID-to-locator database comprises an ID of the receiving host, and wherein the ID of the receiving host is an End Point ID Address (EID) according to a LISP. In some embodiments, the receiver is further configured to receive a second request from the second NE when the second NE is unable to determine a current locator for the receiving host in the set of locators. In some embodiments, each of the locators in the set of locators is a routing locator (RLOC)

according to LISP. In some embodiments, the set of locators is transmitted to the second NE in a map-reply message according to LISP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
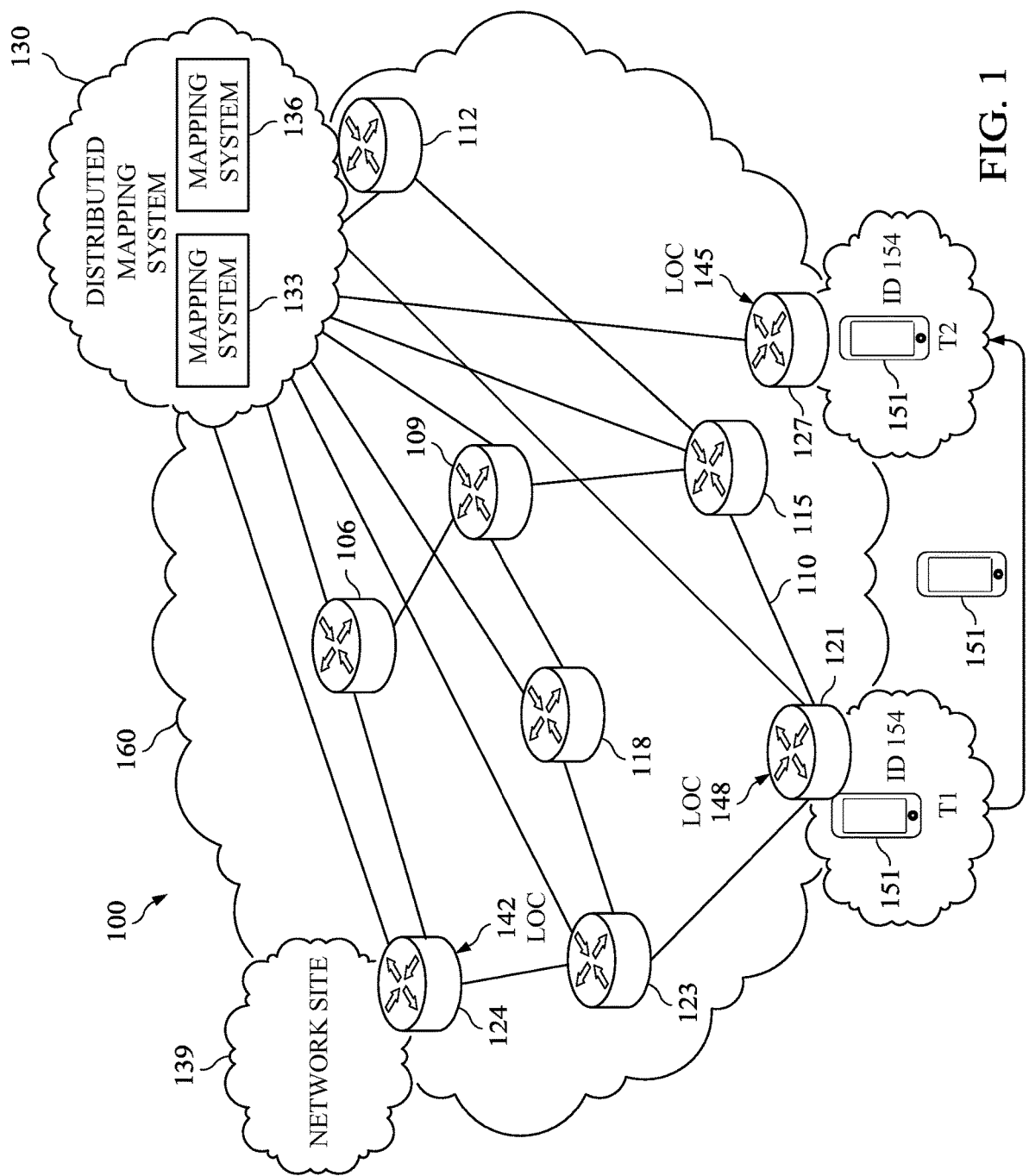
FIG. 1 illustrates an embodiment of an ID oriented network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In IP based networking schemes, IP address semantics utilize both the location and the identity of a node. Therefore, it is difficult to implement mobility of hosts to keep a continuous communication session with remote sites. Identity oriented networks (IONs) disassociate an ID and a location from a host entity device. ID oriented networks divide an IP address into IDs and locators. An ID uniquely identifies a host, and a locator is an address of a router by which the host is reachable. A locator may be an IP address of a router associated with, or attached to, the host. The locator is used for routing addressing and the data packet forwarding. The router by which the host is reachable may be, for example, a network router, a switch, a gateway, a bridge, a base station, an access point, or any other NE by which the host may be reached.

One example of an ID oriented network is a LISP network. LISP is a map-encapsulation scheme that uses endpoint IDs (EIDs) as IDs and routing locators (RLOCs) as locators. LISP additionally encapsulates a layer of a packet header outside the common packet. The source IP address field and the destination IP address field of an outer IP header are represented by a source RLOC and a destination RLOC, respectively. The packets only need to be implemented with routing addressing and forwarding according to the destination RLOC of the outer header of the packet during the network transfer process, and the inner header of the packet remains unchanged during the transfer process. In a LISP network, routers are configured to communicate with a mapping system and other routers in the network on behalf of the hosts. In other ID oriented networks, hosts may communicate without the use of the intermediary routers. For example, hosts may communicate directly with a distributed mapping system and other hosts.

The distributed mapping system in an ID oriented network allows for the location of a node to be determined in an ID based environment. Distributed mapping systems are typically arranged as a complex distributed cluster of servers or a tree with multiple local mapping systems. Hosts, such as UE, typically send control signals from different locations to update the mapping system. For example, a host may either push a current location to the mapping system or the host may wait for a sending host to request a current location of the host device. In either case, hosts must transmit several control signals to a mapping system before two hosts are synchronized to communicate with each other. Present mapping systems typically store exact locators of a host such that the exact locators can be transmitted to sending hosts upon request. Sending of update messages every time a host changes locations and then querying every time a sending host wants to establish a connection leads to unnecessary and excessive consumption of network resources.

Disclosed herein is a method and system to optimize control signaling with the mapping system by obtaining a finite set of locators associated with an host when host mobility is primarily among those multiple finite locations. The host may transmit the finite set of locators to a mapping system. The finite set of locators includes a plurality of locators associated with NEs that the host may be reached by. Each of the locators is an IP address of one of the NEs that the host may be reached by. The mapping system stores the finite set of locators in an entry of a routing database designated by an ID of the host.

Several examples illustrating embodiments of the disclosure are described in the context of LISP architecture. However, the embodiments of the disclosure are not meant to be limited to that context. Indeed, the embodiments disclosed herein are extensible to any ID-oriented architecture that makes use of an ID (e.g., eXpressive Internet Architecture (XIA), and so on) as would be recognized by one skilled in the art.

FIG. 1 illustrates an embodiment of an ID oriented network 100. For example, the ID oriented network 100 may be a LISP network, or any other ID oriented network that would be recognized by one of ordinary skill in the art. LISP may be implemented according to IETF RFC 6830, titled "The Locator/ID Separation Protocol," dated January 2013, which is hereby incorporated by reference in its entirety. ID oriented network 100 generally comprises a plurality of routers 106, 109, 112, 115, and 118, and a plurality of endpoint routers (xTRs) 121, 123, 124, and 127. For example, xTRs 121, 123, 124, and 127 may be a router, a switch, a bridge, a gateway, a base station, an access point, or any NE by which a host may be reached. Routers 106, 109, 112, 115, 118 may be IP routers or label switch routers (LSRs) that are configured to interconnect xTRs 121, 123, 124, and 127. In an embodiment, the routers 106, 109, 112, 115, and 118 may be a root router, one or more provider edge (PE) routers, one or more source PE routers, one or more rendezvous point (RP) PE routers, one or more customer edge (CE) routers, or one or more core routers. For example, at least one of routers 106, 109, 112, 115, and 118 may be a receiver PE router, a CE router, and/or a source PE router, which is configured to form an interface between the service provider network 160 and one or more CE routers. The routers 106, 109, 112, 115, and 118 may each be a device configured to forward data packets within a network and/or between multiple networks. For example, router 118 may be a router within a service provider network 160 and may be configured to form a portion of a backbone or core for the service provider network 160.

Additionally, the routers 106, 109, 112, 115, and 118 and the xTRs 121, 123, 124, and 127 may be interconnected and in data communication with each other via one or more links 110 (e.g., a wireless link or a wired link). Further, the network 100 is configured to employ an IP or non-IP protocol as would be appreciated by one of ordinary skill in the art upon viewing this disclosure. In an embodiment, xTRs 121, 123, 124, and 127 may comprise a local ID-to-locator mapping database and/or an ID-to-locator mapping database, as will be further discussed below.

In an embodiment, one or more of xTRs 121, 123, 124, and 127 may generally be characterized as a PE router that a source (e.g., host) is located on or behind. For example, network site 139 may be the source or host behind xTR 124. Each of the routers 106, 109, 112, 115, and 118 and xTRs 121, 123, 124, and 127 may be configured to employ a routing database, forwarding database, network database, or the like, to control and/or direct data traffic for a given network. For example, each of the routers may generate or establish a routing database to coordinate data communication with other routers within the ID oriented network 100. In an example embodiment, the routing database may be established via a flooding algorithm, a spanning trees algorithm, a reverse path broadcasting algorithm, a truncated reverse path broadcasting algorithm, a reverse path multicasting algorithm, a core-based tree algorithm, or any other suitable database multicast forwarding algorithm as would be appreciated by one of ordinary skill in the art upon viewing this disclosure.

ID oriented network 100 also comprises host 151, which may be a UE, mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, or a client. ID oriented network 100 also comprises network site 139, which may be any network site other than a host 151. In an ID oriented network, an entity, such as host 151 or network site 139, is associated with an identity. An identity is a private and permanent reference to an entity, such as host 151. The identity may be uniquely exclusive to a host 151 or network site 139. For example, an identity may be associated with a plurality of different IDs that each also uniquely identifies the host 151 or network site 139. In a LISP network, the ID is an EID, which is globally unique. In other ID oriented networks, the ID may be in any form so long as the ID can uniquely identify the entity. As used herein, the term ID may refer to an EID in a LISP network, an ID for any other type of ID oriented network, or an identity of a host or network site in an ID oriented network.

The ID oriented network 100 also includes a distributed mapping system 130, which includes a mapping system 133 and a mapping system 136. The distributed mapping system 130 represents a high scale globally distributed or single domain mapping system, typically associated with mobility and identity based protocols that use mappings to attach a host to a locator. In typical ID oriented networks, a distributed mapping system 130 may be a server that registers IDs, advertises IDs, and aggregates IDs into one centralized consolidated database so that NEs over various geographic areas can locate a host associated with an ID. The distributed mapping system 130 is distributed such that several mapping systems, such as mapping systems 133 and mapping systems 136, may serve different geographical areas. For example, the distributed mapping system 130 may comprise a tree structure in which the mapping system 133 is a parent mapping system, and one or more mapping systems 136 are child mapping systems. The mapping systems 133 and 136 typically send control signals to one another whenever an update occurs. For example, when a new host 151 registers with a mapping system 133, the mapping system 133 sends a control message to the mapping system 136, which then sends a control message to another mapping system, and so on, until all the mapping systems in the distributed mapping system 130 have been updated. Similar control messages are sent in the distributed mapping system 130 when a host 151 changes locations or locators. The distributed mapping system 130 may be connected to routers 106, 109, 112, 115, and 118 and xTRs 121, 123, 124, and 127 via links 110.

For example, a typical mapping system 133 and 136 stores ID-to-locator mappings of all the hosts and network sites in network 100. Embodiments of the present disclosure are directed to an optimized mapping system that stores a finite set of locators for each ID instead of just a single ID-to-locator mapping. Each of the mapping systems 133 and 136 includes a mapping resolver configured to identify locators for a host 151. In an embodiment, the routers 106, 109, 112, 115, and 118 and xTRs 121, 123, 124, and 127 may send a map request to a mapping resolver of the mapping systems 133 or 136 to identify a finite set of locators associated with an ID. In an embodiment, the mapping systems 133 and 136 are co-located within a single distributed mapping system 130.

In the embodiment in which ID oriented network 100 implements a LISP protocol, routers 106, 109, 112, 115, and 118, and xTRs 121, 123, 124, and 127 are tunnel routers. The LISP network utilizes the name space handling that includes EIDs and RLOC addresses. An EID is allocated to a host 151 from an EID-prefix block associated with the site (e.g., xTR 121, 124, 127) where the host 151 is located. The EIDs are IDs that may have any format, such as an alphanumeric format. Each EID (e.g., ID 154) identifies a host 151 such as, for example, a mobile phone, databaset, other mobile communications device, an xTR, router, or a LISP site. An EID is an ID used in the inner header of a LISP packet.

In an embodiment, LOC 148, LOC 145, and LOC 142 represent the locators for xTR 121, xTR 127, and xTR 124, respectively. When network 100 implements LISP, LOC 148, LOC 145, and LOC 142 are RLOCs. The RLOCs are IP addresses of various routers and nodes (e.g., xTRs 121, 124, and 127) in the network 100 by which a host 151 or network site 139 is accessible. For example, the ID of the network site 139 maps to LOC 142, and ID 154 of host 151 maps to either LOC 148 or LOC 145 depending on the location of a host 151 at a specific time (e.g., T1 or T2). The RLOCs are addresses and are reached through the usual IP protocols, routing databases, and so on. The RLOC addresses are location-based. Each EID maps to one or more RLOCs.

When the ID oriented network 100 implements LISP, the network site 139 and/or the xTRs 121, 124, and 127 may be an ingress tunnel router (ITR) and/or an egress tunnel router (ETR). The ITR is a LISP site edge device responsible for mapping a destination ID to the destination RLOC. The ITR encapsulates packets and forwards them to the other LISP sites or may simply forward the packets if the destination uses traditional IP. The ITR does not set up any tunnels or perform similar functionality. Rather, the ITR performs only mapping and encapsulation functions. The ETR is a LISP site edge device that receives packets from the core network (IP), decapsulates (a.k.a., unencapsulates) the LISP packets, and forwards the packets to the user device associated with the local destination EID. In an embodiment, the xTRs 121, 124, and 127 may be a router that has a combination of both ingress and egress functions.

In network 100, each xTR identifies the IDs of UEs that are accessible by the xTR and sends the IDs in addition to the locators of the xTR to the distributed mapping system 130. The mapping system 133 or mapping system 136 in the distributed mapping system 130 adds entries for each of the IDs such that each ID is stored in association with a locator by which the UE behind the ID can be reached (ID-to-locator mapping). A mapping resolver may respond to queries sent by ITRs requesting the RLOC for a specified EID. The distributed mapping system 130 is typically centralized within network 100.

As shown in FIG. 1, the ID 154 is an ID assigned to host 151 and is associated at time T1 with xTR 121. In this way, ID 154 maps to LOC 148 at time T1. When host 151 moves from a location associated xTR 121 (at time T2) to a location associated with xTR 127 (at time T2), the ID 154 of host 151 remains unchanged. However, host 151 is associated with a different LOC, LOC 145, at T2. For example, when a host 151 moves locations, the ID of the host 151 remains the same while the LOC changes.

Typically, once host 151 has moved, xTR 127 may send a register message to the distributed mapping system 130 indicating that the ID 154 for host 151 now maps to LOC 145. For example, the mapping system 133 is updated to reflect the change in the LOC for ID 154 such that any other sending host that wants to initiate a session with host 151 can request the LOC of host 151 using ID 154. Disclosed herein are embodiments that eliminate the need for host 151 to send a register message to the distributed mapping system 130 every time host 151 changes LOCs. Instead, the distributed mapping system 130 stores a set of locators for host 151 in the ID-to-locator database. The set of locators includes multiple locators that host 151 is likely to be associated with based on a pattern determined in the locators that the host 151 has previously been associated with.

Figure 2:
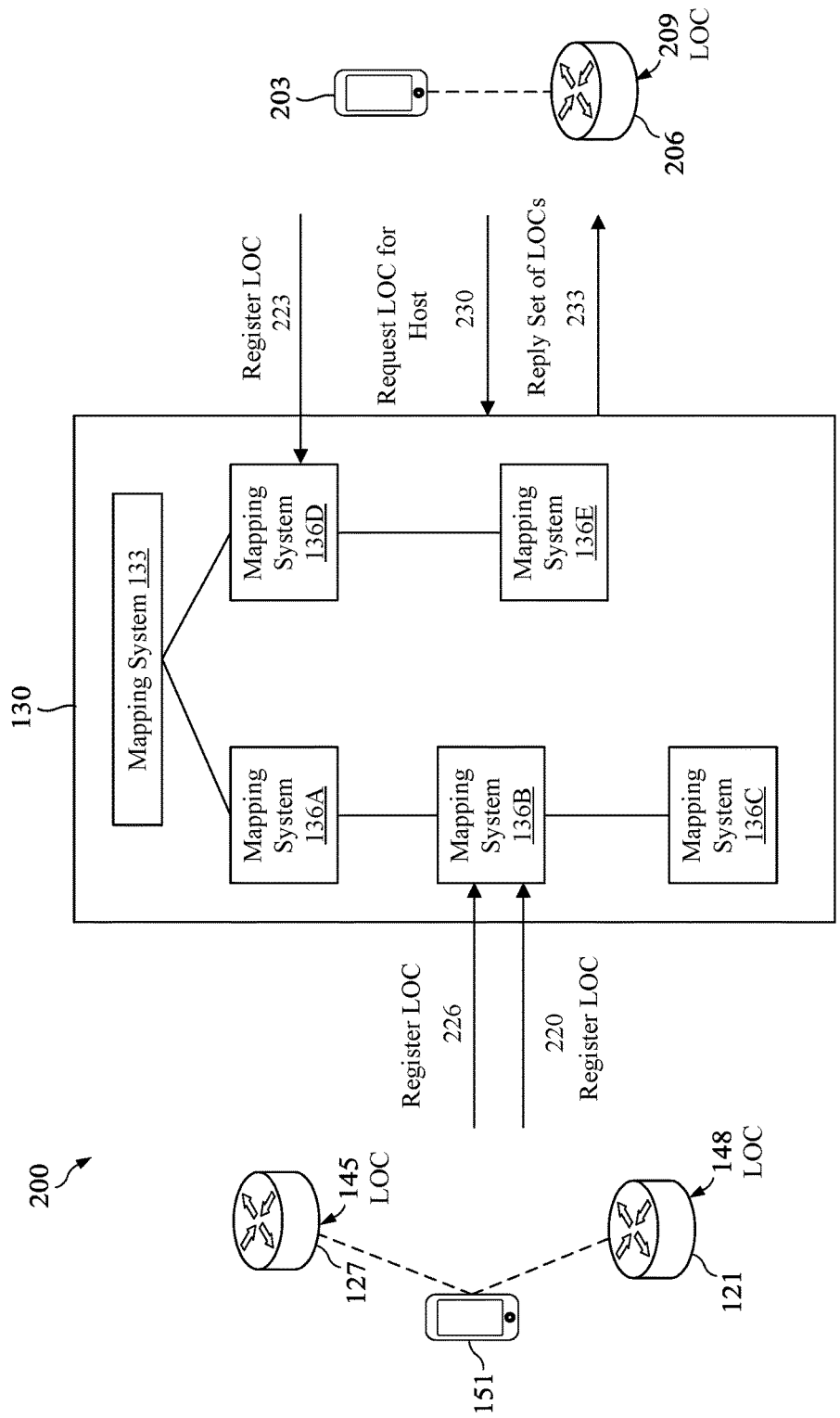
FIG. 2 illustrates an ID oriented network in which hosts register the locators associated with the host at the mapping system.

FIG. 2 illustrates an ID oriented network 200 in which hosts 151 and 203 register the locators associated with the host at the distributed mapping system 130. ID oriented network 200 is similar to ID oriented network 100, except that the distributed mapping system 130 is shown as a tree with multiple mapping systems 136A-E mapping from a parent mapping system 133 and ID oriented network 200 includes two hosts, hosts 151 and 203. ID oriented network 200 includes three xTRs 121, 127, and 206, and a distributed mapping system 130. Host 203 is similar to host 151, and xTR 206 is similar to xTR 121 and 127. While two hosts, three xTRs, and six mapping systems are shown in FIG. 2, it should be appreciated that any number of hosts, xTRs, and mapping systems may be included in ID oriented network 200.

The distributed mapping system 130 is structured as a tree with parent-child relationships. As shown in FIG. 2, the distributed mapping system 130 comprises a parent mapping system 133 as the root node. The parent mapping system 133 has two child nodes, mapping system 136A and mapping system 136D. Mapping system 136A has one child node, mapping system 136B, which also has one child node, mapping system 136C. Mapping system 136D similarly has one child node, mapping system 136E. For example, each of mapping systems 136A-E may be responsible for receiving locator updates and locator requests from hosts within a certain geographical area. In this example, each of mapping systems 136A-E, and mapping system 133, are responsible for different geographical areas.

As shown in FIG. 2, hosts 151 and 203 typically register a current locator associated at the distributed mapping system 130. For example, at arrow 220, host 151 or xTR 121 sends a register message to mapping system 136B when host 151 comes online and binds with xTR 121. The register message indicates that LOC 148 is the address whereby host 151 may be reached. The register message may comprise the ID of host 151 and LOC 148. Similarly, at arrow 223, host 203 or xTR 206 sends a register message to a mapping system 136D when host 203 comes online and binds with xTR 206. The register message indicates that LOC 209 is the address whereby host 203 may be reached. The register message may comprise the ID of host 203 and LOC 209. At this point, only mapping system 136B knows the locator associated with host 151, and only mapping system 136D knows the locator associated with host 203.

The distributed mapping system 130 is configured to update all the other mapping systems 133 and 136A-E when an update to a locator of a host is made on one of the mapping systems 133 and 136A-E. Mapping system 136B may send an update to mapping system 136C and mapping system 136A indicating that host 151's locator is currently LOC 148. Mapping system 136A and mapping system 136C updates their database to reflect that the current locator for host 151 is LOC 148. Mapping system 136A then sends the update to mapping system 133, which updates the local database and then forwards the update to mapping system 136D. Mapping system 136D updates the local database and then forwards the update to mapping system 136E, which updates the local database. Similar control messages are sent across the distributed mapping system 130 in response to host 203's register message being sent to mapping system 136D.

In this way, registering a locator of a host to the distributed mapping system 13 every time a host changes locations leads to excessive signaling to keep the distributed mapping system 130 updated. For example, when host 151 changes locations so that host 151 is now served by xTR 127 instead of xTR 121, the locator of host 151 also changes to LOC 145. At arrow 226, host 151 or xTR 127 sends a new register message that indicates that LOC 145 is now the address whereby host 151 may be reached to mapping system 136B. When the new register message is sent to the mapping system 136B, all the update messages must be sent to all the other nodes of the mapping systems 130, 136A, and 136C-E so that the distributed mapping system 130 is up to date. Therefore, the distributed mapping system 130 is sensitive to the frequency of changes made to the database and may benefit from a reduced number of updates.

A sending host, such as host 203, initiating a communication with host 151 may send a request to the distributed mapping system 130 for a current locator associated with host 151. For example, at arrow 230, host 203 or xTR 206 sends a request to the distributed mapping system 130. For example, a map request may be sent to the mapping system 136E when mapping system 136E is geographically closest to host 203. The request may comprise the ID of host 151. The request signals to the distributed mapping system 130 to send the current locator associated with the ID of host 151. The distributed mapping system 130 returns the current locator associated with the ID of host 151 to host 203. For example, at arrow 233, the distributed mapping system 130 replies with LOC 145 as the current locator of host 151 to xTR 206 or host 203. In this way, a complex controlling signal takes place to identify and distribute the new locator of the device when a sending host is already connected to the host but the locator of the host changes. This causes overheads in synchronizations between the device, remote device, and mapping system.

Distributed mapping systems in ID oriented networks typically require an excessive amount of control signaling to keep updated records of locators of hosts. Further, distributed mapping systems typically return only the current locator of a host upon a request. Disclosed herein is an optimized mapping system that is configured to store multiple locators for a host based on a likelihood that the host will be associated with the locators.

In an embodiment, a sending host 203 may request a set of locators for a host 151 from the distributed mapping system 130 using the ID of the host 151. The distributed mapping system 130 transmits the set of locators to the sending host 203 such that the sending host 203 stores the set of locators and the corresponding ID of host 151 to local routing database. The entry of the local routing database may also be designated by the ID of the host 151. The sending host 203 may transmit a data packet to each of the xTRs associated with the locators in the set of locators. The sending host 203 is configured to wait a period of time to receive a response from any one of the xTRs that may be attached to the host 151. The sending host 203 is configured to update the local ID-to-locator database to indicate the xTR associated with a current location of the host 151 when a response is received from one of the xTRs in the set of locators.

In this way, the sending host 203 may initiate a connection with the host 151 using a set of locators stored at the local ID-to-locator database instead of having to query the distributed mapping system 130 multiple times. In addition, host 151 also need not update the distributed mapping system 130 each time the host 151 moves to another location reachable by a locator in the set of locators. According to some embodiments, the distributed mapping system 130 may not know the exact location of the hosts 151 and 203.

In an embodiment, the distributed mapping system 130 receives the set of locators from a management entity executed externally that is configured to generate the set of locators based on history of the host being associated with each of the locators. In an embodiment, the distributed mapping system 130 aggregates and selects the locators for the set of locators based on a frequency of times that the host is associated with the locator during a period of time. For example, the host may be associated with a locator at a home of the host every single day, and the host may be associated with a locator of an office building Monday through Friday. In this example, the frequency of times the host is associated with the locator of the home and the locator of the office building may be higher than a predetermined number of times, and therefore, each of these locators may be included in the set of locators. In another embodiment, the host generates the set of locators based on a likelihood that the host associates with the locators. In another embodiment, the xTRs generates the set of locators based on a likelihood that the host associates with the set of locators. Once the distributed mapping system 130 receives the set of locators, the distributed mapping system 130 is configured to send the set of locators to the sending host 203 upon request. According to some embodiments, the distributed mapping system no longer needs to be involved in maintaining communication between the host 151 and the sending host 203. The host 151 and the sending host 203 can autonomously communicate current locations and associated locators with each other using the set of locators.

Figure 3:
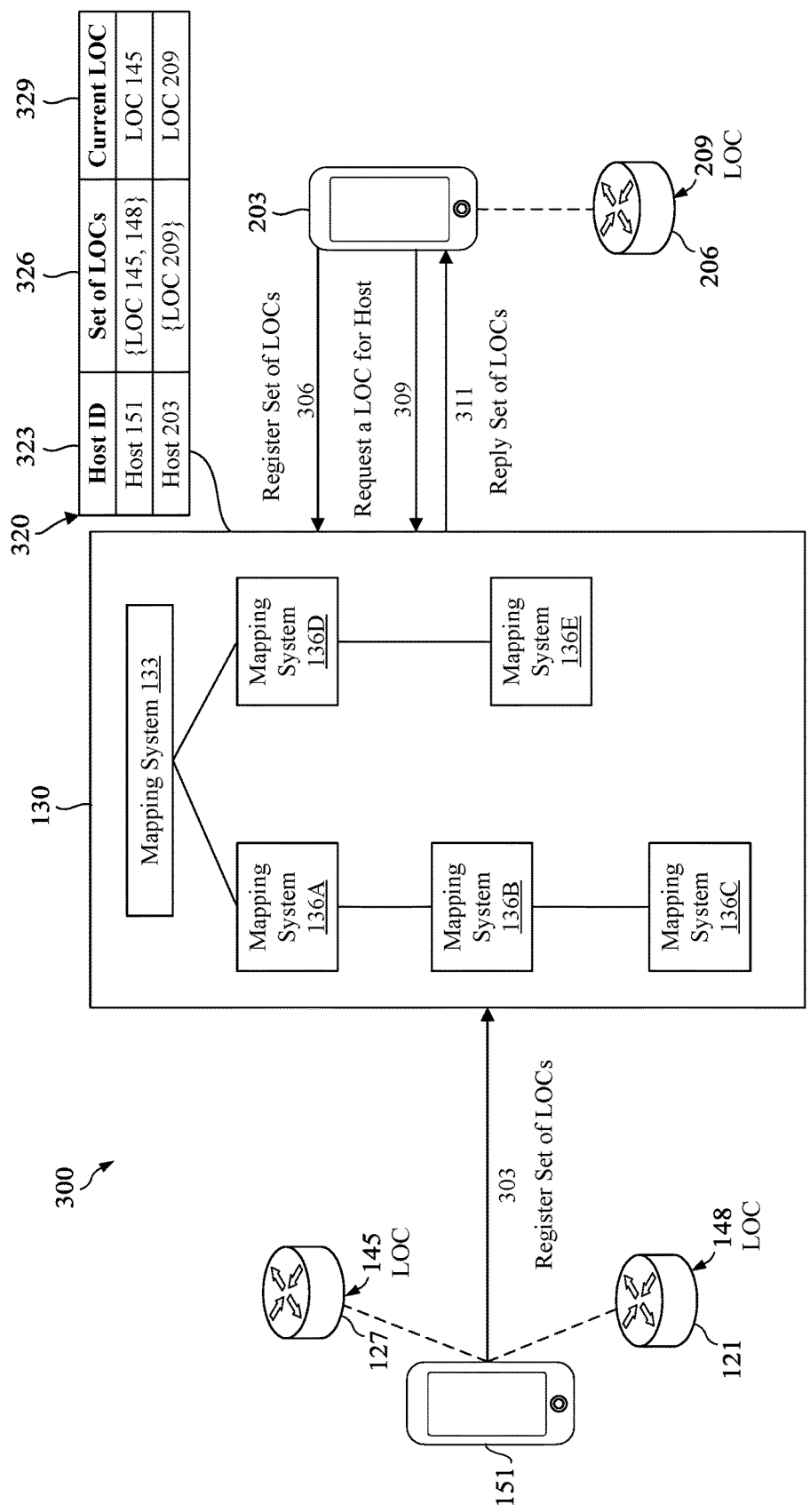
FIG. 3 illustrates an ID oriented network implementing a host based communication scheme according to an embodiment of the disclosure.

FIG. 3 illustrates an ID oriented network 300 implementing a host based communication scheme according to an embodiment of the disclosure. ID oriented network 300 is similar to ID oriented network 200 except that the hosts 151 and 203 and xTRs 121, 127, and 206 do not have to register with the distributed mapping system 130, and the distributed mapping system 130 returns a set of locators for a host upon request instead of a single locator. Similar to ID oriented network 200, ID oriented network 300 comprises hosts 151 and 203, xTRs 127, 121, and 206, and a distributed mapping system 130. The distributed mapping system 130 is structured as a tree comprising parent mapping system 133 and child mapping systems 136A-E.

ID oriented network 300 implements a host based communication scheme. The host based communication scheme enables the hosts 151 and 203 to communicate directly with the distributed mapping system 130 without having to use xTRs 121, 127, and 206. In addition, embodiments of the present disclosure enable the hosts 151 and 203 to transmit a set of locators to the distributed mapping system 130. This way, the hosts 151 and 203 do not have to transmit periodic update messages to the distributed mapping system 130 every time the hosts 151 or 203 changes location.

A set of locators comprises one or more locators by which a host is reachable. Each of the locators in the set of locators is determined based on a likelihood that the host is attached to the locators. In an embodiment, a locator is added to the set of locators based on a pattern determined in a history of the host attaching to the locator. For example, suppose host 151 is a mobile device, and the owner of the mobile device works Monday through Friday from 9:00 AM to 5:00 PM in an office about thirty minutes away from the owner's home. Typically, after work, the owner goes to the gym for an hour before going home. A predetermined time period after the mobile device begins operation, the mobile device, or xTR associated with the mobile device, may be configured to determine that the mobile device is frequently associated with a first locator when at home, a second locator when at work, and a third locator when at the gym on Monday through Friday. Each of these locators may be added to the set of locators for the mobile device.

In one embodiment, the set of locators may be determined based on a frequency at which the host has attached to the locator. In an embodiment, a locator is added to the set of locators if the host has attached to the locator more than a predetermined number of times within a predetermined period of time. For example, suppose the mobile device frequently visits another home with another locator. After the mobile device visits the other home a predetermined number of times within a predetermined period of time, the other locator of the other home may be added to the host's set of locators.

The set of locators may also comprise backup locators that may be used when a more frequent locator fails. For example, when the mobile device is at home, there may be two prominent locators used at home, the locator for the home wireless router, and the locator for the data connection router. The mobile device may be configured to attach to the locator of the home wireless router by default, and if the locator for the home wireless router fails, the locator for the data connection router is included in the set of locators as a backup locator.

In an embodiment, a server provider of the host may include certain locators in the set of locators. In an embodiment, applications executed by the host may include certain locators in the set of locators. In an embodiment, an operator of the host may also include certain locators in the set of locators. For example, an operator of the host may enter locators manually into the host via a user interface. Each of the locators in the set of locators are determined based on a likelihood that the host is located in a region served by the locator.

For the example shown in FIG. 3, host 151 may be a receiving host, and may be referred to herein as the receiving host 151. Similarly, host 203 may be sending host, and may be referred to herein as the sending host 203. As shown in FIG. 3, receiving host 151 can be reached at either LOC 145 or LOC 148 depending on the location of receiving host 151. For example, receiving host 151's set of locators comprises {LOC 145, LOC 148}. While only two locators are included in receiving host 151's set of locators, it should be appreciated that any number of locators may be included in a set of locators. In an embodiment, receiving host 151 determines that LOC 145 is the locator associated with the receiving host 151's home, and LOC 148 is the locator associated with receiving host 151's workplace.

At arrow 303, receiving host 151 transmits the set of locators {LOC 145, LOC 148} to the distributed mapping system 130. In an embodiment, the receiving host 151 transmits the set of locators with an ID of the receiving host 151. In an embodiment, receiving host 151 transmits the set of locators directly to the parent mapping system 133. This way, the remaining child mapping systems 136A-136E can be updated to include the set of locators for host 151 efficiently. At arrow 306, sending host 203 also sends the set of locators {LOC 209} to the distributed mapping system 130. While only one locator is included in sending host 203's set of locators, it should be appreciated that any number of locators may be included in sending host 203's set of locators. In an embodiment, the sending host 203 transmits the set of locators with an ID of the sending host 203. In an embodiment, sending host 203 transmits the set of locators directly to the parent mapping system 133. While FIG. 3 shows the receiving host 151 sending one message comprising the set of locators, in another embodiment, receiving host 151 may separately send each of the locators in the set of locators in different messages. In this embodiment, the distributed mapping system 130 is configured to aggregate each of the locators into a set of locators. In this way, instead of discarding previous locators from the distributed mapping system 130 every time a host changes locators, the distributed mapping system 130 disclosed herein is configured to maintain a dynamic ID-to-locator database that is incrementally updated. The distributed mapping system 130 disclosed herein helps stabilize high scale distribution resolution systems.

In an embodiment, the hosts 151 and 203 transmit the sets of locators to the distributed mapping system 130 using, for example, a web portal to the distributed mapping system 130. In an embodiment, the hosts 151 and 203 transmit the sets of locators to the distributed mapping system 130 using, for example, an application programming interface. As should be appreciated, the hosts 151 and 203 transmit the sets of locators to the distributed mapping system 130 using any type of portal or interface that communicates directly with the distributed mapping system 130 without the use of xTRs 121, 127, 206.

When a sending host 203 initiates a communication session with host 151, the sending sending host 203 first requests a locator of host 151 from the distributed mapping system 130. However, in some embodiments, the distributed mapping system 130 returns the set of locators for the receiving host 151 instead of just a current locator for the receiving host 151. As shown in FIG. 3, at arrow 309, the sending host 203 sends a request for a locator of host 151. In an embodiment, the request for the locator of the receiving host 151 comprises the ID of the receiving host 151. In an embodiment, the request for the locator of the receiving host 151 may be sent to any one of the mapping systems 133 and 136A-E. At arrow 311, the distributed mapping system 130 determines the set of locators {LOC 145, LOC 148} for the receiving host 151 based on the ID of the receiving host 151 and transmits the set of locators {LOC 145, LOC 148} for the receiving host 151 to the sending host 203. In an embodiment, the mapping system 136E, which may be a mapping system located closest to the sending host 203, sends the reply with the set of locators of the receiving host 151 to the sending host 203.

In an embodiment, the distributed mapping system 130 may aggregate the different locators associated with the host and store all the locators in an entry of an ID-to-locator database. In this way, instead of discarding previous locators from the ID-to-locator database that stores the current locator to specific device IDs, or host IDs, the mapping system maintains a dynamic ID-to-locator database that is incrementally updated. Therefore, the mapping database stores multiple locators for each host or device.

ID-to-locator database 320 shows an example of a portion of an ID-to-locator database stored at each of mapping systems 133 and mapping systems 136A-E. The ID-to-locator database 320 includes rows for all of the hosts in the ID oriented network 300. The ID-to-locator database 320 includes a column 323 for the host ID, a column 326 for the set of locators for each host ID, and column 329 for the current locator that the host is attached to. The host ID may be any alphanumeric value that uniquely identifies the host. For each host ID, the ID-to-locator database 320 stores the set of locators and a current locator, if known, of each host, as will be further described below. According to this embodiment, the host does not need to update the distributed mapping system 130 each time the host changes locations to another locator. Embodiments of the present disclosure help stabilize high scale systems. The host based communication scheme implemented by ID oriented network 300 enables the host to perform all communications without the intervention of the xTRs.

Figure 4:
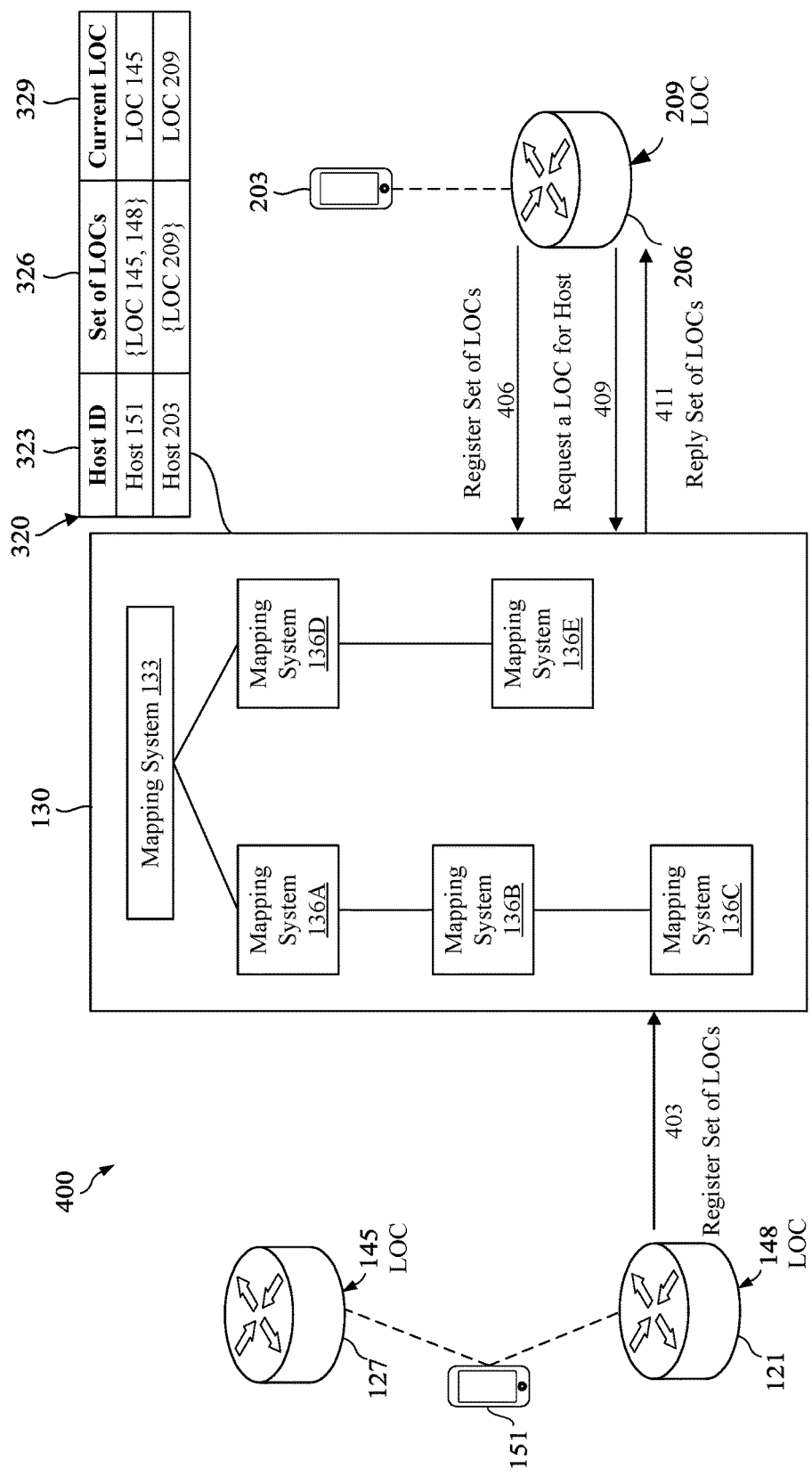
FIG. 4 illustrates an ID oriented network implementing a network based communication scheme according to an embodiment of the disclosure.

FIG. 4 illustrates an ID oriented network 400 implementing a network based communication scheme according to an embodiment of the disclosure. ID oriented network 400 is similar to ID oriented network 300, except that instead of the hosts directly communicating with the distributed mapping system 130, the xTRs communicate with the distributed mapping system 130 on behalf of the hosts. Each of arrows 403, 406, 409, and 411 are similar to arrows 303, 306, 309, and 311, except that messages 403, 406, 409, and 411 are sent by the xTRs 121, 127, and 206 instead of the hosts 151 and 203.

In the network based communication scheme, the receiving host 151 and the sending host 203 are not aware of the distributed mapping system 130, and the receiving host 151 and the sending host 203 may not communicate with the distributed mapping system 130 in the network based communication system. The xTRs 121, 127, and 206 generate the set of locators on behalf of the receiving host 151 and the sending host 203 to communicate register messages and request messages with the distributed mapping system 130 on behalf of the receiving host 151 and the sending host 203. In one embodiment, the receiving host 151 and the sending host 203 may be configured to instruct the xTRs 121, 127, and 206 to send messages on behalf of the the receiving host 151 and the sending host 203. For example, xTRs 121 and 127 may be receiving xTRs 121 and 127 that each sends the set of locators for the receiving host 151 to the distributed mapping system 130. xTR 203 may be a sending xTR 203 that sends the set of locators for the sending host 203 to the distributed mapping system 130 and receives the set of locators for the sending host 151 from the distributed mapping system 130. As shown in FIG. 4, only one of the xTRs, receiving xTR 121, may need to send the set of locators for the receiving host 151 to the distributed mapping system 130 since the set of locators includes the locator for the receiving xTR 127. Therefore, control signaling is reduced when sending register messages to the distributed mapping system 130 according to some embodiments.

Figure 5:
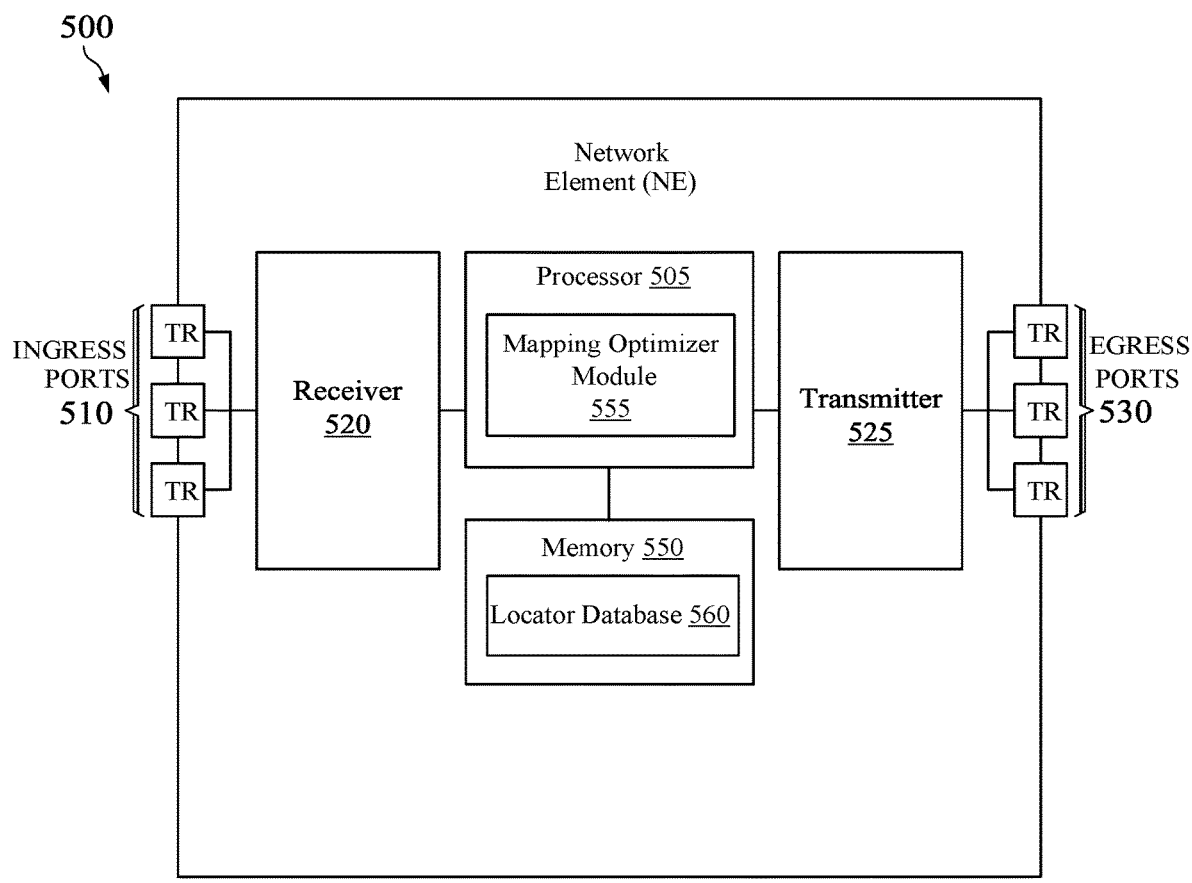
FIG. 5 is a diagram of an embodiment of a NE in an ID oriented network.

FIG. 5 is a diagram of an embodiment of a NE 500 in an ID oriented network, such as the networks 100, 200, 300, and 400. For instance, the NE 500 may be a host, such as the hosts 151 and 203, an xTR, such as xTRs 121, 123, 124, or 206, or a mapping system, such as mapping systems 133 and 136A-E. The NE 500 may be configured to implement and/or support the anonymity mechanisms described herein. The NE 500 may be implemented in a single node or the functionality of NE 500 may be implemented in a plurality of nodes. One skilled in the art will recognize that the term NE encompasses a broad range of devices of which NE 500 is merely an example. The NE 500 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 500. For instance, the features and/or methods in the disclosure may be implemented using hardware, firmware, and/or software installed to run on hardware. As shown in FIG. 5, the NE 500 comprises one or more ingress ports 510 and a receiver unit (Rx) 520 for receiving data, at least one processor, logic unit, or central processing unit (CPU) 505 to process the data, a transmitter unit (Tx) 525 and one or more egress ports 530 for transmitting the data, and a memory 550 for storing the data.

The processor 505 may comprise one or more multi-core processors and be coupled to a memory 550, which may function as data stores, buffers, etc. The processor 505 may be implemented as a general processor or may be part of one or more application specific integrated circuits (ASICs) and/or digital signal processors (DSPs). The processor 505 may comprises a mapping optimizer module 555, which may perform processing functions of a host, such as the hosts 151 and 203, an xTR, such as xTRs 121, 123, 124, or 206, or a mapping system, such as mapping systems 133 and 136A-E, and implement methods 700, 800, and 900, as discussed more fully below, and/or any other method discussed herein. As such, the inclusion of the mapping optimizer module 555 and associated methods and systems provide improvements to the functionality of the NE 500. Further, the mapping optimizer module 555 effects a transformation of a particular article (e.g., the network) to a different state. In an alternative embodiment, mapping optimizer module 555 may be implemented as instructions stored in the memory 550, which may be executed by the processor 505.

The memory 550 may comprise a cache for temporarily storing content, e.g., a random-access memory (RAM). Additionally, the memory 550 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof The memory 550 may be configured to store routing databases and/or ID to locator mappings. In an embodiment, the memory 550 may comprise locator database 560, which may be structured similar to ID-to-locator database 320. In an embodiment, the locator database 560 stores an entry for each identity of a host or network site in an ID oriented network. The locator database 560 stores the set of locators and a current locator for each host in the ID oriented network.

When NE 500 is a host, the NE 500 performs similar to hosts 151 and 203 in FIGS. 3 and 4. In an embodiment, processor 505 of the host is configured to generate a set of locators for the host, and the Tx 525 of the host is configured to transmit the set of locators to the mapping system. When NE 500 is an xTR, the NE 500 performs similar to xTRs 121, 127, and 206 in FIGS. 3 and 4. In an embodiment, processor 505 of the xTR is configured to generate a set of locators for each host that attaches to the xTR. The Tx 525 of the xTR is configured to transmit each of the set of locators to the mapping system. In an embodiment, the memory 550 of the xTR saves the set of locators for multiple hosts in the ID oriented network in association with an ID of each of the hosts. In an embodiment, the memory 550 further stores a current locator for each of the hosts in association with an ID of each of the hosts. When NE 500 is a mapping system, the NE 500 performs similar to the distributed mapping system 130 in FIGS. 3 and 4. In an embodiment, a Rx 520 of the mapping system receives the set of locators from hosts and/or xTRs, and the memory 550 stores the sets of locators in association with IDs of each of the hosts. In an embodiment, the Rx 520 of the mapping system also receives requests for locators from sending hosts. The Tx 525 of the xTR is configured to transmit the set of locators for a requested host upon request.

It is understood that by programming and/or loading executable instructions onto the NE 500, at least one of the processor 505 and/or memory 550 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 6:
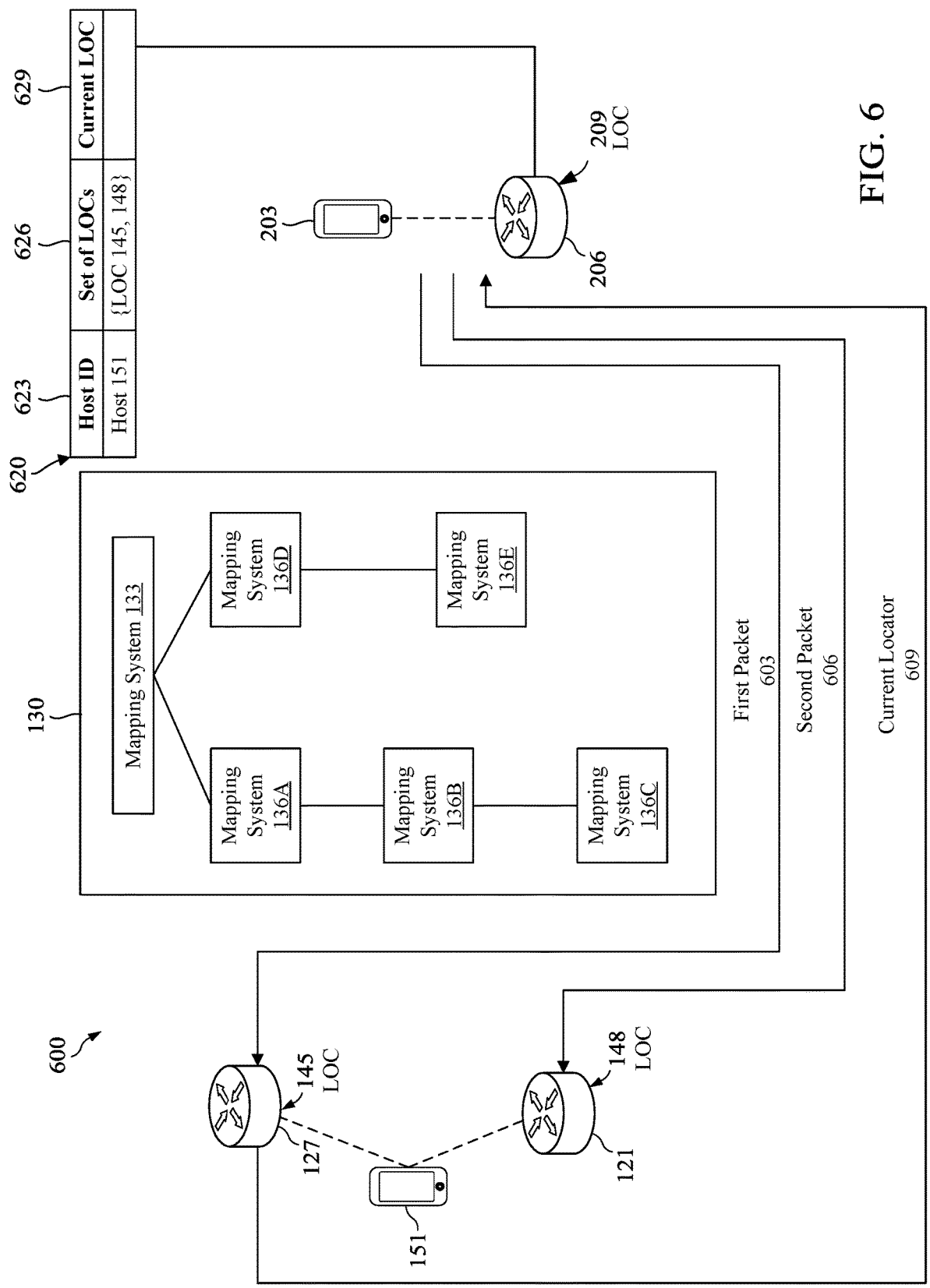
FIG. 6 illustrates an ID oriented network and how a sending host communicates with a host using the set of locators received from the distributed mapping system.

FIG. 6 illustrates ID oriented network 600 and how the sending host 203 communicates with the receiving host 151 using the set of locators received from the distributed mapping system 130. ID oriented network 600 is similar to ID oriented networks 300 and 400. ID oriented network 600 is in a state in which sending host 203 has already requested the locator for the receiving host 151 at arrows 309 and 409 of FIGS. 3 and 4 and received the set of locators for the receiving host 151 from the distributed mapping system 130 at arrows 311 and 411 of FIGS. 3 and 4. In one embodiment in which network 600 implements a host based communication scheme similar to network 300, the sending xTR 206 received the set of locators for the receiving host 151. In another embodiment in which network 600 implements a network based communication scheme similar to network 400, the sending host 203 received the set of locators for the receiving host 151.

In either type of communication scheme, the sending xTR 206 stores the set of locators for the receiving host 151 locally in association with an ID of the receiving host 151. For example, the sending xTR 206 stores a local ID-to-locator database 620. The local ID-to-locator database 620 is similar to ID-to-locator database 320, except that the local ID-to-locator database 620 is obtained from the distributed mapping system 130 and cached at the sending xTR 206 such that the local ID-to-locator database 620 stores a set of locators for hosts that the sending xTR 206 communicates with. In an embodiment, the local ID-to-locator database 620 may be used so that a request to a mapping system may not be needed every time the sending xTR 206 initiates communication with a host. This is because the set of locators for that host may already be cached at the local ID-to-locator database 620. The local ID-to-locator database 620 may be updated periodically or as needed to obtain a most current set of locators for already stored hosts or new sets of locators for new hosts. The local ID-to-locator database 620 includes a column 623 for the host ID, a column 626 for the set of locators for each host ID, and a column 629 for the current locator that the host is attached to. In an embodiment, the local ID-to-locator database 620 stores sets of locators for hosts that the sending host 203 has requested the set of locators for. As shown in FIG. 6, since the sending host 203 has requested and received the set of locators for the receiving host 151, the set of locators for the receiving host 151 is stored in local ID-to-locator database 620. Although only one entry is shown in local ID-to-locator database 620, the local ID-to-locator database 620 may store any number of entries for different hosts.

The local ID-to-locator database 620 also stores the current locator for each of the host IDs. As shown in FIG. 6, the sending xTR 206 does not store the current locator for the receiving host 151 yet. In an embodiment, when the set of locators for host 151 is received, the sending xTR 206 is configured to determine the current locator for the receiving host 151, or determine which one of the locators in the set of locators that the receiving host 151 is currently attached to. In an embodiment, the sending xTR 206 determines the current locator for the receiving host 151 by sending a packet to all the locators in the set of locators for the receiving host 151. In an embodiment, the packet includes a user payload, a source host ID, a destination host ID, a source locator, and a destination locator. For example, the packet sent by the sending xTR 206 to the receiving xTR 127 includes an ID of the sending host 203 as the source host ID, an ID of the receiving host 151 as the destination host ID, LOC 209 as the source locator, and LOC 145 as the destination locator. Similarly, the packet sent by the sending xTR 206 to the receiving xTR 121 includes an ID of the sending host 203 as the source host ID, an ID of the receiving host 151 as the destination host ID, LOC 209 as the source locator, and LOC 148 as the destination locator. For example, when the sending xTR 206 determines the current locator for the receiving host 151, the sending xTR 206 sends a packet to both the receiving xTR 127, having LOC 145, and the receiving xTR 121, having LOC 148. As shown in FIG. 6, at arrow 603, the sending xTR 206 sends a first packet to the receiving xTR 127 having LOC 145. At arrow 606, the sending xTR 206 sends a second packet to the receiving xTR 121 having LOC 148.

Once the sending xTR 206 sends the packets to all the locators in the set of locators for the receiving host 151, the sending xTR 206 waits for a predetermined period of time to receive a reply from one of the locators. When a reply is received from one of the locators, then the current locator of the receiving host 151 may be determined. At arrow 609, the receiving xTR 121 sends a second packet to the sending xTR 206 as the reply. In an embodiment, the second packet also includes a user payload, a source host ID, a destination host ID, a source locator, and a destination locator. For example, the second packet sent by the receiving xTR 121 includes an ID of the receiving host 151 as the source host ID, a ID of the sending host 206 as the destination host ID, LOC 148 as the source locator, and locator 209 as the destination locator. At this point, the sending xTR 206 determines that the xTR that is currently servicing the receiving host 151 is the receiving xTR 121 and current the locator for host 151 is LOC 148. In an embodiment, the xTR saves the current locator for the receiving host 151 the local ID-to-locator database 620 at column 629 for the entry for host 151.

Once the sending xTR 206 has determined the current locator for the receiving host 151, the sending host 203 and the receiving host 151 may initiate a communication session and transmit data to each other. In an embodiment, when the receiving host 151 changes location again, the receiving host 151 does not need to send a register message to the distributed mapping system 130, and the sending host 203 does not need to request the locator from the distributed mapping system 130. In this case, the sending host 203 automatically determines that the current locator has changed to another locator in the set of locators. In this embodiment, the sending host 203 need not send the packet to all locators again. In an embodiment, the receiving host 151 responds from a specific locator in a reply packet if it is a connection oriented session, such as transfer control protocol (TCP) or quick user datagram protocol (UDP) Internet connections (QUIC). If it is a connection-less transport session, such as UDP, then the reply needs to be explicitly solicited from one of the locators in the set of locators. Using this method, the sending host 203 can autonomously determine the locator of receiving host 151, and as such, the connection between the receiving host 151 and the sending host 203 is more secure because only the receiving host 151 and the sending host 203 know the exact locator of each other. In an embodiment, the sending xTR 206 can notify the distributed mapping system 130 of the current locator of the receiving host 151.

In some embodiments, the receiving host 151 may not be associated with any of the locators in the set of locators. For example, the sending host 203 may not receive a reply from any of the receiving xTRs 121 or 127 because the receiving host 151 may not be attached to any of the receiving xTRs 121 or 127. In such a case, the sending host 203 or the sending xTR 206 may revert back to requesting the distributed mapping system 130 for the current locator of the receiving host 151. In an embodiment, the receiving host 151 may be configured to register with the distributed mapping system 130 when the receiving host 151 is not attached to any of the locators in the set of locators. For example, when the receiving host 151 is not reachable by either the receiving xTR 121 or 127, the receiving host 151 may be configured to send a register message comprising the locator by which the receiving host 151 may be reached to the distributed mapping system 130.

In some embodiments, the method includes a determination of weight and cost. For example, when a multi-homed locator set is distributed, the host independently selects a locator. The sending host sends a first packet to all multi-homed NEs from the locator set and the host selects the one that best balances weight and cost. This method is an enabler and facilitates network slicing based paths in a mobile network environment. In the case of a traffic overload indication for multi-access scenarios, the host can self-trigger offloading to a different locator dynamically. For example, the host can alter the data path to a new locator from the locator set such that no provider side configuration or mapping system involvement is needed.

Figure 7:
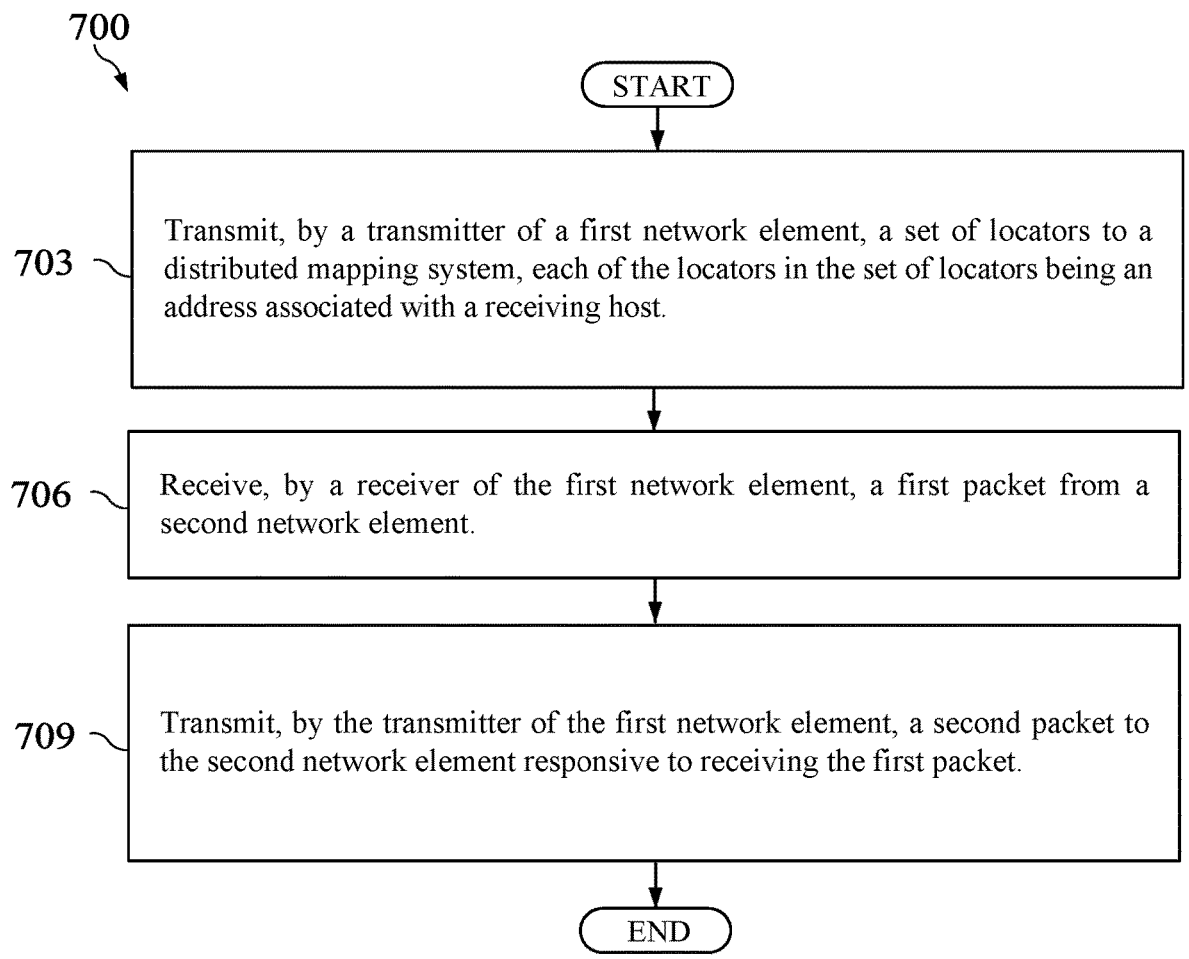
FIG. 7 is a flowchart of a method of updating a distributed mapping system.

FIG. 7 is a flowchart of method 700 of updating a distributed mapping system. The method is implemented by a first NE, such as a receiving host 151 or receiving xTRs 121 and 127. The method 700 may be implemented when, for example, the NE sends the set of locators for the receiving host to a distributed mapping system, such as distributed mapping system 130. In block 703, a set of locators is transmitted to the distributed mapping system. For example, the Tx 525 of the first NE transmits the set of locators for the receiving host to the distributed mapping system. When the first NE is an element of a host based ID oriented network, such as ID oriented network 300, the first NE is the receiving host. When the first NE is an element of a network based ID oriented network, such as ID oriented network 400, the first NE is the receiving xTR attached to the receiving host or the receiving xTR transmits the set of locators on behalf of the receiving host.

In an embodiment in which the NE implements LISP, the set of locators may be transmitted in a map update message, similar to the map-register message defined by IETF RFC 6833 entitled "Locator/ID Separation Protocol (LISP) Map-Server Interface," January 2013, which is incorporated by reference in its entirety. In other embodiments, the NE may transmit the set of locators a new message or in a field of an existing message. In an embodiment, the set of locators comprises one or more locators, or one or more IP addresses, of the xTRs associated with the host. In an embodiment, the locators in the set of locators are determined based on a likelihood of the host being associated with the locator. For example, each of the locators is determined based on a history of the host being associated with the locator. For example, each of the locators is determined based on an operator of the host entering locators that the host is most frequently associated with.

In block 706, a first packet is received from a second NE. In an embodiment, Rx 520 receives the first packet from the second NE. The second NE is configured to send the first packet to a plurality of NEs associated with each of the locators in the set of locators when the second NE is initiating communication with the first NE. The second NE sends the first packet to several locators to find the locator behind which the host is located. When the host is currently reachable by one of the locators in the set of the locators, then the first data packet is received. The second NE may be a sending host or a sending xTR depending on the type of communication scheme that the ID oriented network implements. In block 709, a second packet is transmitted to the second NE in response to receiving the first packet. In an embodiment, the Tx 525 transmits the second packet to the second NE in response to receiving the first packet. The second packet may comprise a locator indicating an address of a current location of the host. When the second NE receives the second packet from the first NE, the second NE is configured to identify the locator of the second NE based on the locator of the NE that sent the second packet. In an embodiment, the second NE updates a local ID-to-locator database to indicate the current locator of the host.

According to some embodiments, the first NE does not have to send a new message to the distributed mapping system each time a host changes location. Instead, the first NE is instructed to send the set of locators to the distributed mapping system one time. Therefore, unnecessary register requests and update messages do not constantly need to be sent to the distributed mapping system and within the distributed mapping system each time the host changes location. Once the distributed mapping system has stored the set of locators stored in an entry of the locator database in association with an ID of the host, the distributed mapping system can transmit the set of locators to sending hosts that want to establish a connection with the host, regardless of whether the host has changed locations or not.

In an embodiment in which the first NE changes locations to another locator in the set of locators, the second NE does not need to request the locator from the distributed mapping system. The new locator is already included in the set of locators stored at the local ID-to-locator database of the second NE. In one embodiment, the second NE again sends a data packet to all the locators in the set of locators and waits for a response from one of the locators. In one embodiment, the second NE does not have to send the data packet to all the locators in the set of locators again, instead the second NE can just wait for a response from one of the locators when the host changes location. The new locator is updated in the local ID-to-locator database of the second NE.

Figure 8:
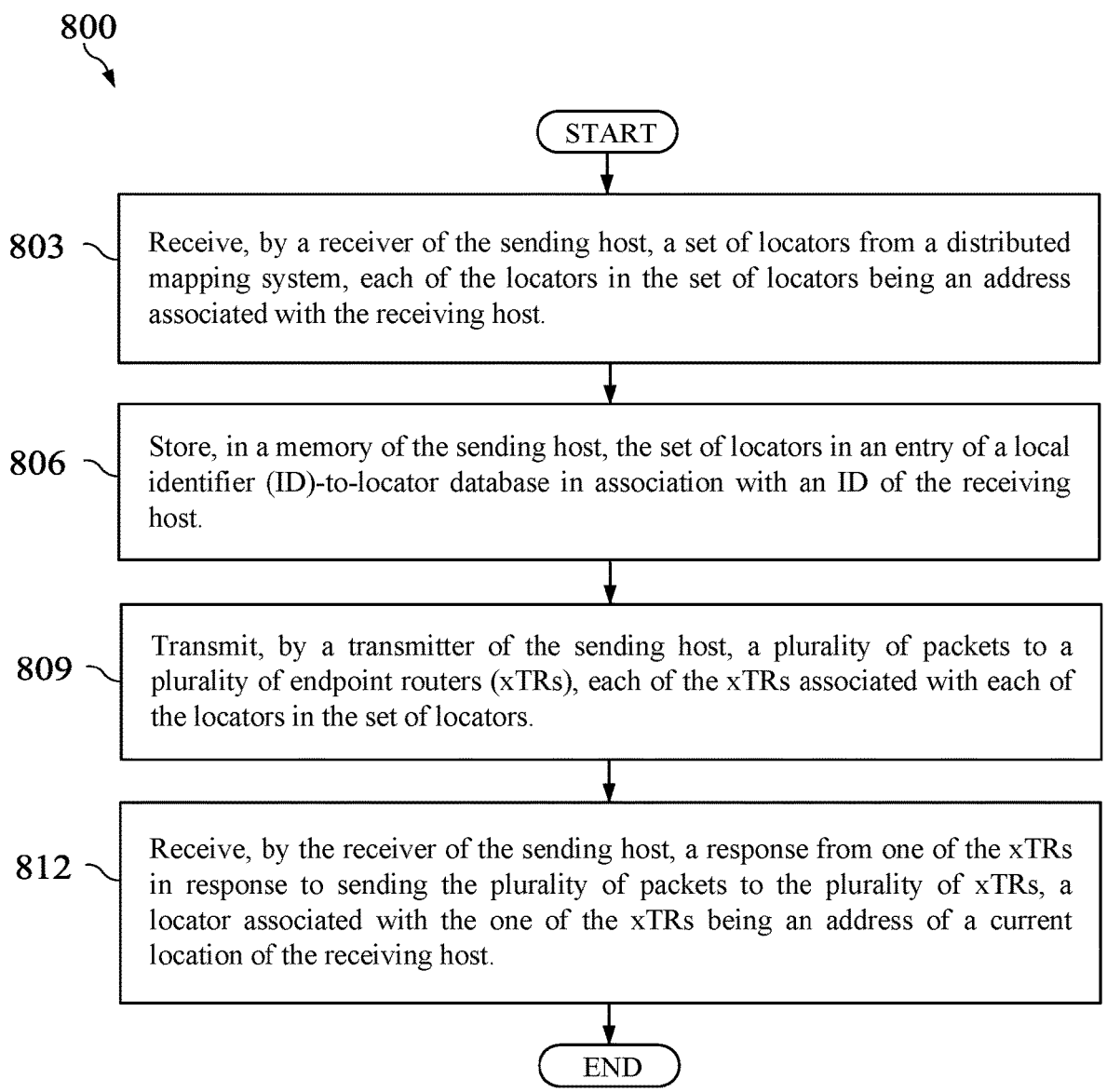
FIG. 8 is a flowchart of a method for querying for a locator of a host.

FIG. 8 is a flowchart of a method 800 for querying for a locator of a receiving host. The method is implemented by, for example, sending host 203 or sending xTR 206. The method may be used when, for example, a sending host sends a request to the distributed mapping system, such as distributed mapping system 130, for a locator associated with an ID of a host, such as receiving host 151. In block 803, a set of locators for a host is received from the distributed mapping system. In an embodiment, Rx 520 of a NE implemented as a sending host receives the set of locators from the distributed mapping system. In an embodiment, the set of locators for the host is received in response to the sending host sending a request for a locator of the host.

In an embodiment, the request for the locator may include an ID of the host. In an embodiment in which the sending host implements LISP, the request for the locator may be a map-request message as defined by IETF RFC 6830. In other embodiments, the request for the locator may be a new message or a field of an existing message. In a host based ID oriented network, such as ID oriented network 300, the sending host receives the set of locators. In a network based ID oriented network, such as ID oriented network 400, a sending xTR attached to the sending host receives the set of locators, and the sending xTR transmits the request for the locator on behalf of the sending host.

In block 806, the set of locators is stored in an entry of a local ID-to-locator database in association with an ID of the receiving host. In an embodiment, the set of locators is stored in the locator database 560 of the memory 550 of a NE, which may be a sending host or a sending xTR. In an embodiment, the local ID-to-locator database can be stored in a cache of the NE. The local ID-to-locator database is organized according to the IDs of various hosts such that each ID can be associated with one or more locators and a current locator. In block 809, a plurality of packets are transmitted to a plurality of xTRs, each of the xTRs associated with each of the locators in the set of locators. For example, a Tx 525 of the NE transmits a data packet to all of the various xTRs associated with addresses defined by the locators in the set of locators stored in the entry of the local ID-to-locator database.

In block 812, a response is received from one of the xTRs in response to sending the data packet to the xTRs associated with each of the locators in the set of locators. In an embodiment, the Rx 520 receives the response from the one of the xTRs. In an embodiment, the locator associated with the one of the xTRs is a current location of the host. In an embodiment, the entry in the local ID-to-locator database associated with the ID of the host is marked to indicate the locator associated with the current location of the host. In an embodiment, the locator associated with the current location of the host may be flagged in the entry of the ID-to-locator database stored at the sending xTR. In another embodiment, a column in the entry may include the locator associated with the current location of the host.

According to some embodiments, the sending host or sending xTR has knowledge of all of the locators that the receiving host may be associated with and the current locator of the receiving host after receiving the set of locators. Therefore, for subsequent data packet transmissions to the receiving host, the sending host or sending xTR no longer needs to query the distributed mapping system to obtain a current locator of the host. Accordingly, embodiments of the present disclosure eliminate the need to transmit and receive wasteful control signaling typically required before establishing a connection between the end devices.

In a case where the sending host or sending xTR transmits a data packet to one or more of the xTRs associated with the locators in the set of locators and does not receive a response from one of the xTRs, a miss case occurs. For example, a miss case occurs when the host is not at a location associated with any of the locators in the set of locators. Another miss case occurs when none of the xTRs associated with the locators in the set of locators sends a response to the sending host or sending xTR. In such a case, the receiving host may be at a location that the host has never been in before. Alternatively, the receiving host may be at a location that the distributed mapping system otherwise does not recognize as being a likely location based on recognized patterns of the host. In any of these miss cases, the method falls back to the original mapping system update mechanism, whereby the sending host signals the distributed mapping system to send a request to the receiving host to update the current location of the host at the distributed mapping system. This way the sending host can obtain the current location of the host after the host updates the mapping system.

Figure 9:
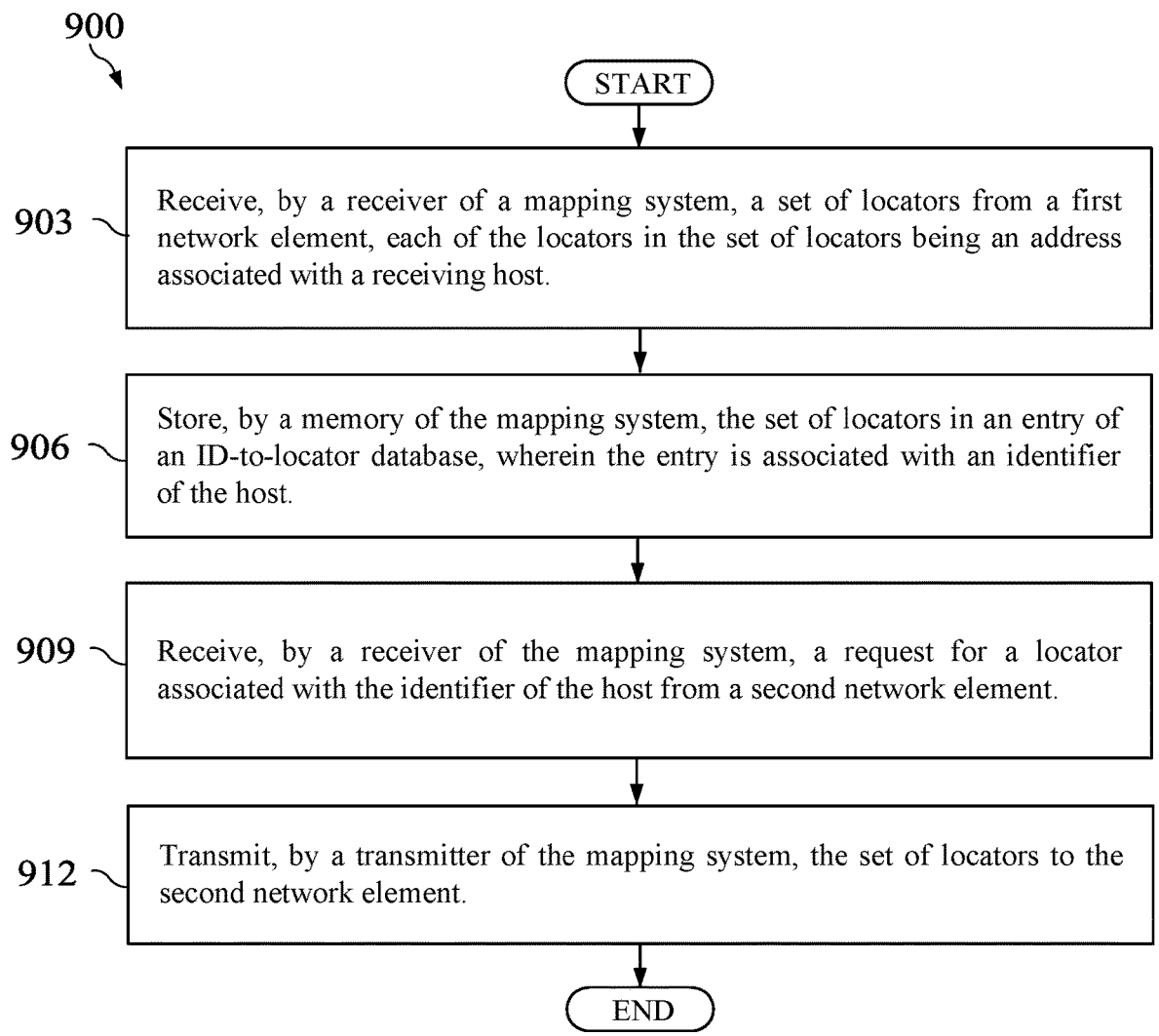
FIG. 9 is a flowchart of a method for storing the set of locators for a host and providing the set of locators to a sending host.

FIG. 9 is a flowchart of a method 900 for storing the set of locators for a host and providing the set of locators to a sending host. The method is implemented by, for example, the distributed mapping system 130 when receiving a set of locators from a first NE. In block 903, a set of locators is received from the first NE. In an embodiment, the Rx 520 receives the set of locators from the first NE. In an embodiment, a locator in the set of locators determined based on a history of a host being associated with the locator. The first NE may be a host or an xTR depending on the type of communication scheme that the ID oriented network implements. The first NE may be the receiving host 151 or the receiving xTRs 127 or 121. In block 906, the set of locators is stored in an entry of a locator database. In an embodiment, the set of locators is stored in the locator database 560 of the memory 550 of the distributed mapping system. The locator database may be similar to the ID-to-locator database 320. In an embodiment, the entry of the locator database is associated with an ID of the host.

In block 909, a request for the set of locators associated with the host is received from a second NE. The second NE may be the sending host 203 or the sending xTR 206. In an embodiment, Rx 520 receives the request for the set of locators from the second NE. In an embodiment, the request may comprise an ID of the host. In an embodiment, the request may be a map-request message as defined by IETF RFC 6830. In other embodiments, the request for the locator may be a new message or a field of an existing message. The second NE may be a host or an xTR depending on the type of communication scheme that the ID oriented network implements. In block 912, the set of locators is transmitted to the second NE. For example, the Tx 525 of the mapping system transmits the set of locators to the second NE. In an embodiment, the set of locators may be transmitted to the second NE in a map-reply message, as defined by IETF RFC 6830. In other embodiments, the set of locators may be sent in a new message or a field of an existing message.

In systems of multi-homing or multiple accesses, the method includes a determination of weight and cost. For example, when a multi-homed locator set is distributed, the host independently selects a locator. The sending host sends a first packet to all multi-homed NEs from the locator set and the host selects the one that best balances weight and cost. This method is an enabler and facilitates network slicing based paths in a mobile network environment. In the case of a traffic overload indication for multi-access scenarios, the host can self-trigger offloading to a different locator dynamically. For example, the host can alter the data path to a new locator from the locator set such that no provider side configuration or mapping system involvement is needed.

In an embodiment, the disclosure includes a means for receiving a set of locators from a distributed mapping system, each of the locators in the set of locators being an address associated with the receiving host, storing the set of locators in an entry of a local ID-to-locator database in association with an ID of the receiving host, a means for transmitting a plurality of packets to a plurality xTRs, each of the xTRs associated with each of the locators in the set of locators, and a means for a response from one of the xTRs in response to sending the plurality of packets to the plurality of xTRs, a locator associated with the one of the xTRs being an address of a current location of the receiving host.

In an embodiment, the disclosure includes a means for transmitting a set of locators to a distributed mapping system, each of the locators in the set of locators being an address of one or more receiving xTRx, the receiving host being associated with the receiving xTRs, a means for a first packet from a sending xTR associated with a sending host, a means for transmitting a second packet to the sending xTR responsive to receiving the first packet, the second packet comprising a locator indicating an address of a current location of the receiving host.

In an embodiment, the disclosure includes a means for receiving a set of locators from a first NE, each of the locators in the set of locators being an address associated with a receiving host, a means for storing the set of locators in an entry of an ID-to-locator database, the entry being associated with an ID of the host, a means for receiving a request for a locator associated with the ID of the host from a second NE, and a means for transmitting the set of locators to the second NE, While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a sending host in an Identifier Enabled Network (IEN), comprising:
   receiving, by a receiver of the sending host, a set of locators from a distributed mapping system, each locator in the set of locators being an address of a receiving host, the sending host and the receiving host comprising user equipment (UEs) associated with different end users;
   storing, in a memory of the sending host, the set of locators in an entry of a local identifier (ID)-to-locator database in association with an ID of the receiving host;
   transmitting, by a transmitter of the sending host, a plurality of packets to a plurality of endpoint routers (xTRs) in communication with a plurality of receiving hosts including the receiving host, each of the plurality of xTRs associated with each of the locators in the set of locators; and
   receiving, by the receiver of the sending host, a response from one of the plurality of xTRs in response to sending the plurality of packets to the plurality of xTRs, the response including a locator associated with the one of the plurality of xTRs, the locator being an address of a current location of the receiving host.

2. The method of claim 1, further comprising transmitting, by a transmitter of the sending host, a request for the locator of the receiving host to the distributed mapping system, wherein the request comprises the ID of the receiving host.

3. The method of claim 1, further comprising updating, by a processor of the sending host, an entry of a local ID-to-locator database to indicate that the locator in the set of locators is the address of the current location of the receiving host.

4. The method of claim 1, wherein the sending host is a mobile device that is initiating communication with the receiving host.

5. The method of claim 1, further comprising receiving, by the receiver, a second response from a second xTR when a locator of the receiving host changes.

6. A receiving endpoint router (xTR) implemented as a network element (NE), comprising:
   a transmitter configured to transmit a set of locators to a distributed mapping system, each locator in the set of locators being an address of one or more receiving xTRs, the one or more receiving xTRs being associated with a receiving host; and
   a receiver coupled to the transmitter and configured to receive a first packet from a sending xTR associated with a sending host,
   the transmitter being further configured to transmit a second packet to the sending xTR responsive to receiving the first packet, and
   the second packet comprising a locator indicating an address of a current location of the receiving host.

7. The receiving xTR of claim 6, further comprising a processor coupled to the transmitter and the receiver and configured to select the locator to add to the set of locators in response to determining that the receiving host has associated with the locator more than a predetermined number of times.

8. The receiving xTR of claim 6, further comprising a processor coupled to the transmitter and the receiver and configured to select the locator to add to the set of locators in response to determining that the receiving host has a pattern of associating with the locator.

9. The receiving xTR of claim 6, wherein the set of locators is transmitted in a field of a map-register message according to a Locator/Identification Separation Protocol (LISP).

10. The receiving xTR of claim 6, wherein the transmitter is further configured to transmit a third packet to a second sending xTR when the receiving host changes locators to a second locator, wherein the second sending xTR is addressed by the second locator.

11. The receiving xTR of claim 6, wherein the receiving xTR is a router by which the receiving host is reachable.

12. A mapping system, comprising:
   a receiver configured to receive a set of locators from a first network element (NE), each locator in the set of locators being an address of a receiving host;
   a memory coupled to the receiver and configured to store the set of locators in an entry of an identifier (ID)-to-locator database, the entry being associated with an ID of the receiving host,
   the receiver being further configured to receive a request for a locator associated with the ID of the receiving host from a second NE; and
   a transmitter coupled to the memory and configured to transmit the set of locators to the second NE.

13. The mapping system of claim 12, wherein the request comprises the ID of the receiving host.

14. The mapping system of claim 12, wherein the first NE is a router by which the receiving host is reachable, and wherein the second NE is a router by which a sending host is reachable.

15. The mapping system of claim 12, wherein a ID-to-locator database is organized according to IDs of a plurality of hosts, and wherein each entry in the ID-to-locator database comprises a set of locators for each of the hosts.

16. The mapping system of claim 12, wherein the entry of the ID-to-locator database comprises an ID of the receiving host, and wherein the ID of the receiving host is an End Point ID Address (EID) according to a Locator/Identification Separation Protocol (LISP).

17. The mapping system of claim 12, wherein the receiver is further configured to receive a second request from the second NE when the second NE is unable to determine a current locator for the receiving host in the set of locators.

18. The mapping system of claim 12, wherein each locator in the set of locators is a routing locator (RLOC) according to Locator/Identification Separation Protocol (LISP).

19. The mapping system of claim 12, wherein the set of locators is transmitted to the second NE in a map-reply message according to Locator/Identification Separation Protocol (LISP).

* * * * *